US012666206B2

(12) United States Patent
Ishikawa et al.

(10) Patent No.: US 12,666,206 B2
(45) Date of Patent: Jun. 23, 2026

(54) ACOUSTIC FEATURE COMPUTING APPARATUS, ACOUSTIC FEATURE COMPUTING METHOD, AND PROGRAM

(71) Applicant: NTT, Inc., Tokyo (JP)

(72) Inventors: Kenji Ishikawa, Tokyo (JP); Yoshifumi Shiraki, Tokyo (JP); Takehiro Moriya, Tokyo (JP)

(73) Assignee: NTT, Inc., Tokyo (JP)

( * ) Notice: Subject to any disclaimer, the term of this patent is extended or adjusted under 35 U.S.C. 154(b) by 263 days.

(21) Appl. No.: 18/578,272

(22) PCT Filed: Jul. 20, 2021

(86) PCT No.: PCT/JP2021/027075
§ 371 (c)(1),
(2) Date: Jan. 10, 2024

(87) PCT Pub. No.: WO2023/002554
PCT Pub. Date: Jan. 26, 2023

(65) Prior Publication Data
US 2024/0305932 A1 Sep. 12, 2024

(51) Int. Cl.
*H04R 23/00* (2006.01)
*H04R 29/00* (2006.01)

(52) U.S. Cl.
CPC ......... *H04R 23/008* (2013.01); *H04R 29/001* (2013.01); *H04R 2217/03* (2013.01)

(58) Field of Classification Search
CPC ........................... H04R 23/008; H04R 29/001; H04R 2217/03; H04R 29/00; G10K 15/00
See application file for complete search history.

(56) References Cited

U.S. PATENT DOCUMENTS

2018/0288548 A1* 10/2018 Quan .................. H04R 29/001

OTHER PUBLICATIONS

Gan et al. (2012) "A review of parametric acoustic array in air," Applied Acoustics, vol. 73, Issue 12, pp. 1211-1219.

* cited by examiner

*Primary Examiner* — Mark Fischer

(57) ABSTRACT

A technique for accurately measuring acoustic characteristics of a parametric array is provided. A first calculation unit that calculates a complex amplitude d of an optical phase at a frequency $f_d$ from an amount of change $\varphi_s$ of the optical phase caused by demodulated sound S, assuming that $q_{diff}(\xi', \eta')$ is a function defined using a Gaussian beam expansion method, a second calculation unit that calculates a function value $q_{diff}(\xi, \eta)$ at a point X and a line integral value $\int_L q_{diff}(\xi', \eta)d\xi'$ of the function $q_{diff}(\xi', \eta)$ along the optical path L, and a third calculation unit that calculates a complex amplitude p of the demodulated sound with the frequency $f_d$ at the point X using the complex amplitude d, the function value $q_{diff}(\xi, \eta)$, and the line integral value $\int_L q_{diff}(\xi', \eta)d\xi'$ are included.

4 Claims, 5 Drawing Sheets

ACOUSTIC FEATURE COMPUTING APPARATUS, ACOUSTIC FEATURE COMPUTING METHOD, AND PROGRAM

CROSS-REFERENCE TO RELATED APPLICATIONS

This application is a U.S. 371 Application of International Patent Application No. PCT/JP2021/027075, filed on 20 Jul. 2021, the disclosure of which is hereby incorporated herein by reference in its entirety.

TECHNICAL FIELD

The present invention relates to a technique for measuring acoustic characteristics of a parametric array.

BACKGROUND ART

A parametric array is a nonlinear acoustic phenomenon in which sound is generated in a space due to nonlinearity of a medium (see Non Patent Literature 1). More specifically, a parametric array is a phenomenon in which, when sound having two different frequencies propagates, nonlinear sound having a frequency represented by the difference between the frequencies is generated. A parametric array speaker that reproduces audible sound using this phenomenon is used for reproduction of sound in a limited space, spatial sound representation technologies, noise control, and the like.

It is known that, when audible sound generated by using a parametric array (hereinafter, referred to as "demodulated sound") is measured by using a microphone, noise called spurious sound is generated. Spurious sound is nonlinear noise of a sound receiving system including a microphone, the noise being generated by large-amplitude ultrasonic waves in a parametric array. Since the frequency of spurious sound is the same as that of the demodulated sound in principle, the demodulated sound to be measured is superimposed on the spurious sound and thus both of the demodulated sound and the spurious sound are detected in an indistinguishable manner.

CITATION LIST

Non Patent Literature

Non Patent Literature 1: Woon-Seng Gan, Jun Yang, and Tomoo Kamakura, "A review of parametric acoustic array in air," Applied Acoustics, Vol. 73, Issue 12, pp. 1211-1219, 2012.

SUMMARY OF INVENTION

Technical Problem

In order to measure the acoustic characteristics of demodulated sound, a method of removing spurious sound by using an acoustic filter that attenuates ultrasonic components incident on a microphone which causes spurious sound in a space and transmits demodulated sound components has been conceived. However, the effect of removing spurious sound with an acoustic filter is limited, and the spurious sound cannot be completely removed. That is, acoustic characteristics of demodulated sound cannot be accurately measured.

Therefore, an objective of the present invention is to provide a technique for accurately measuring acoustic characteristics of a parametric array.

Solution to Problem

An aspect of the present invention includes, assuming that L represents an optical path for a sound field measurement device configured to measure a phase change of light due to audible sound (hereinafter, referred to as "demodulated sound") S generated by a parametric array created using the transducer that is a substantially circular sound source, C represents a point at which the optical path L intersects a straight line passing through the transducer and parallel to a propagation direction of the demodulated sound S, X represents a point on the optical path L at which a distance from the point C is x, z represents a distance from the transducer to the optical path L, a represents a radius of the transducer, $f_d=|f_1-f_2|$ (where $f_1$ is a frequency of a carrier wave and $f_2$ is a frequency of a sideband wave) represents a frequency of the demodulated sound S, and c represents the speed of sound, a first calculation unit that calculates a complex amplitude d of an optical phase at the frequency $f_d$ from an amount of change $\varphi_s$ of the optical phase caused by the demodulated sound S, assuming that $q_{diff}(\xi', \eta')$ is a function defined using a Gaussian beam expansion method, a second calculation unit that calculates a function value $q_{diff}(\xi, \eta)$ at the point X (where $\xi=x/a$, $\eta=2z/ka^2$, $k_1=f_1/c$, $k_2=f_2/c$, and $k=(k_1+k_2)/2$ are satisfied) and a line integral value $\int_L q_{diff}(\xi', \eta')d\xi'$ of the function $q_{diff}(\xi', \eta)$ along the optical path L, and a third calculation unit that calculates a complex amplitude p of the demodulated sound with the frequency $f_d$ at the point X using the complex amplitude d of the optical phase at the frequency $f_d$, the function value $q_{diff}(\xi, \eta)$ at the point X, and the line integral value $\int_L q_{diff}(\xi', \eta)d\xi'$ of the function $q_{diff}(\xi', \eta)$ along the optical path L.

Advantageous Effects of Invention

According to the present invention, it is possible to accurately measure acoustic characteristics of a parametric array.

DESCRIPTION OF EMBODIMENTS

Figure 1:
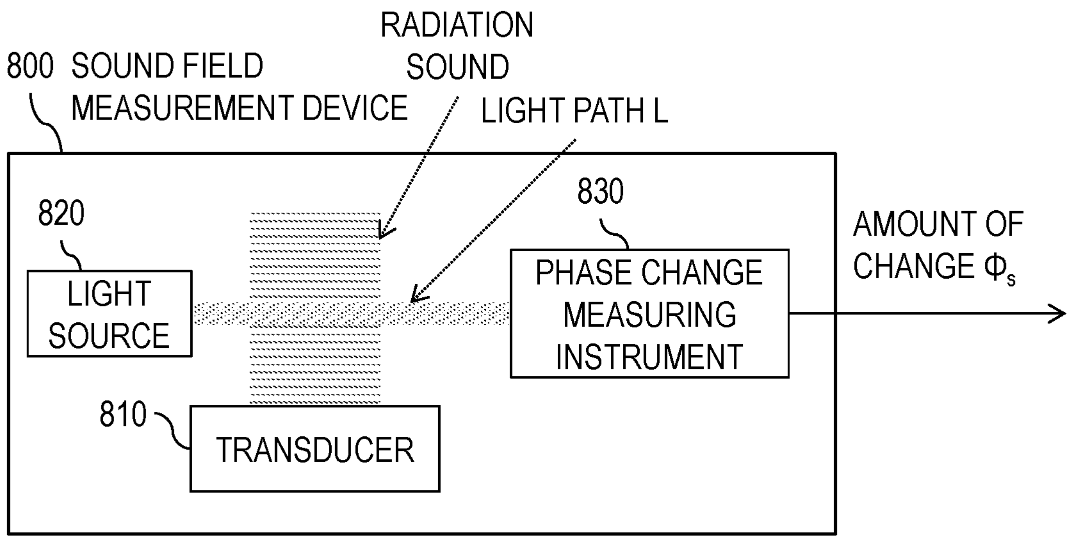
FIG. 1 is a block diagram illustrating a configuration of a sound field measurement device 800.

Hereinafter, an embodiment of the present invention will be described in detail. Note that components having the same functions are denoted by the same reference numerals, and redundant description will be omitted.

Prior to the description of each embodiment, a notation method in the present specification will be described.

^ (caret) represents a superscript. For example, $x^{y\text{^}z}$ represents that $y^z$ is a superscript for x, and $x_{y\text{^}z}$ represents that $y^z$ is a subscript for x. Furthermore, _ (underscore) represents a subscript. For example, $x^{y\_z}$ represents that $y_z$ is a superscript for x, and $x_{y\_z}$ represents that $y_z$ is a subscript for x.

A superscript "^" or "~" such as ^x or ~x for a certain letter x would normally be placed directly above "x", but is written as ^x or ~x due to restrictions on notation in the specification.

Technical Background

In an embodiment of the present invention, a parametric array is measured in a non-contact manner by using a sound measurement technique using light (refer to Reference Non Patent Literature 1), thereby realizing measurement without presence of spurious sound in principle. As described in [Background Art], spurious sound is caused by a nonlinear response from the vibrating membrane of a microphone. In the sound measurement technique using light, there is no equivalent to a vibrating membrane, so spurious sound is not supposed to be generated in principle.

(Reference Non Patent Literature 1: Kenji Ishikawa, Kohei Yatabe, Nachanant Chitanont, Yusuke Ikeda, Yasuhiro Oikawa, Takashi Onuma, Hayato Niwa, and Minoru Yoshii, "High-speed imaging of sound using parallel phase-shifting interferometry," Optics Express, Vol. 24, Issue 12, pp. 12922-12932, 2016)

First, a sound field measurement method using a change in the refractive index of a medium caused by sound, which is called the acousto-optic effect, will be described. According to the acousto-optic effect, the amount of change $\varphi_s$ of the optical phase due to sound is expressed by the following expression.

[Math. 1]

$$\phi_s = k_l \frac{n_0 - 1}{\gamma P_0} \int_L p dx \tag{1}$$

Here, $k_l$ is a wave number of light, $n_0$ is a refractive index of air in a steady state, $P_0$ is atmospheric pressure in a steady state, and $\gamma$ is a specific heat ratio of air. The integral of Expression (1) represents the line integral of a sound pressure p along the light propagation path (hereinafter, referred to as an optical path) L. Here, the x axis is defined to be parallel to the optical path L. In addition, the sound pressure p is a sound pressure at a certain time. Note that $k_l$, $n_0$, $P_0$, and $\gamma$ are constants determined from physical conditions at the time of the measurement.

As can be seen from Expression (1), the amount of change $\varphi_s$ of the optical phase due to the sound is not an amount representing the sound pressure at one point in the space, but an amount proportional to the line integral value of the sound pressure along the optical path L.

In the embodiment of the present invention, the complex amplitude p of demodulated sound at one point in the space is calculated from the amount of change $\varphi_s$ of the optical phase, which is a measured value, by using Gaussian beam expansion (GBE). Specifically, a carrier wave and a sideband wave that cause demodulated sound are each approximated with a sum of Gaussian beams. Here, the Gaussian beam is a wave in which a complex amplitude obtained by Fourier transforming a sound pressure in a certain time slot is expressed by a Gaussian function. In addition, a wave generated from a sound source that makes a piston motion can be approximated with a sum of Gaussian beams.

Hereinafter, a circular sound source such as a parametric array speaker configured by arranging a plurality of microphones in a circular shape is assumed as a sound source that generates a parametric array. The sound source may be a substantially circular sound source instead of a perfectly circular one. The waves generated from the sound source performing piston motions handled in the embodiment of the present invention are generated when all the microphones constituting the parametric array speaker emit the same sound.

It is assumed that p represents the complex amplitude of the demodulated sound with frequency $f_d=|f_1-f_2|$ generated by the interaction of a carrier wave with frequency $f_1$ and a sideband wave with frequency $f_2$. According to Reference Non Patent Literature 2, the complex amplitude p of demodulated sound generated by a circular sound source can be expressed as the following expression by using the Gaussian beam expansion method.

[Math. 2]

$$p(\xi, \eta; k_d) = -p_0^{(1)} p_0^{(2)} \frac{\beta (k_d a)^2}{\rho c^2} q_{diff}(\xi, \eta) e^{ik_d z} \tag{2}$$

Here, $\xi=x/a$, $\eta=2z/ka^2$, $k=(k_1+k_2)/2$, and $k_d=k_1-k_2$ are satisfied, where a represents the radius of the sound source, $k_1$ represents the wave number of the carrier wave, $k_2$ represents the wave number of the sideband wave, $p_0^{(1)}$ represents the amplitude of the carrier wave, $p_0^{(2)}$ represents the amplitude of the sideband wave, $\beta$ represents a nonlinear coefficient of air, $\rho$ represents a density of air, c represents the speed of sound, and i represents an imaginary unit. In addition, the z axis is defined to be parallel to the propagation direction of the demodulated sound. Note that the wave numbers $k_1$ and $k_2$ can be expressed as $k_1=f_1/c$ and $k_2=f_2/c$, respectively. Therefore, $k_d=f_d/c$ is satisfied.

In addition, $q_{diff}(\xi, \eta)$ represents a term representing the beam shape of the demodulated sound and is defined by the following expressions.

[Math. 3]

$$q_{diff}(\xi, \eta) = \sum_{m=1}^{10} \sum_{m'=1}^{10} A_m A_{m'} q_{diff}^{(mm')}(\xi, \eta) \tag{3}$$

[Math. 4]

$$q_{diff}^{(mm')}(\xi, \eta) = \frac{1}{4 r_1^{(mm')}} \exp\left(-\frac{s_1^{(mm')}}{r_1^{(mm')}} \xi^2\right) \times \left[E_1\left(\frac{s_2^{(mm')}}{r_1^{(mm')}\left(r_1^{(mm')}\eta + r_2^{(mm')}\right)} \xi^2\right) - E_1\left(\frac{s_2^{(mm')}}{r_1^{(mm')} r_2^{(mm')}} \xi^2\right)\right]$$

Here, m is a parameter representing a Gaussian beam used to approximate a carrier wave, and m' is a parameter representing a Gaussian beam used to approximate a sideband wave. As can be seen from Expression (3), the carrier wave and the sideband wave are respectively approximated using 10 Gaussian beams. This is based on the fact that it is empirically known that sufficient approximation accuracy can be obtained when 10 Gaussian beams are used. In addition, $A_m$ and $A_{m'}$ (m=1, . . . , 10, and m'=1, . . . , 10) are coefficients of the Gaussian beam, and for example, the value of $A_n$ in Table 1 of Reference Non Patent Literature 3 can be used. In addition, $E_1(x)$ is an exponential integral function. $r_1^{(mm')}$, $r_2^{(mm')}$, $s_1^{(mm')}$, $s_2^{(mm')}$ (m=1, . . . , 10, and m'=1, . . . , 10) are each defined by the following expressions (see Reference Non Patent Literature 2).

[Math. 5]

$$r_1^{(mm')} = \left(k_a B_{k_b m'} + k_b B_{k_a m}\right) + i(k_a + k_b)\eta B_{k_a m} B_{k_b m'}$$

[Math. 6]

$$r_2^{(mm')} = \left(k_a B_{k_a m} + k_b B_{k_b m'}\right)\eta - i(k_a + k_b)$$

[Math. 7]

$$s_1^{(mm')} = (k_a + k_b)^2 B_{k_a m} B_{k_b m'}$$

[Math. 8]

$$s_2^{(mm')} = -i(k_a + k_b)k_a k_b\left(B_{k_a m} - B_{k_b m'}\right)^2$$

[Math. 9]

$$B_{k_a m} = \frac{B_m^{(1)}}{k_a} + \frac{i}{\delta}$$

[Math. 10]

$$B_{k_b m'} = \frac{B_{m'}^{(2)}}{k_b} + \frac{i}{\delta}$$

Here, $k_a = k_1/k$ and $k_b = -k_2/k$ are satisfied. In addition, $B_m^{(1)}$ and $B_{m'}^{(2)}$ (m=1, . . . , 10, and m'=1, . . . , 10) are predetermined constants, and for example, the value of $B_n$ in Table 1 of Reference Non Patent Literature 3 can be used. δ represents the normalized radius of curvature of the sound source. If the sound source is planar, δ is infinite, and the term i/δ is zero.

That is, Expression (2) is an expression representing the complex amplitude of the demodulated sound generated by the interaction between the carrier wave and the sideband wave in a case where the carrier wave and the sideband wave are approximated with the sum of the Gaussian beams.

(Reference Non Patent Literature 2: Desheng Ding, "A simplified algorithm for the second-order sound fields," The Journal of Acoustical Society of America, Vol. 108, Issue 6, pp. 2759-2764, 2000)

(Reference Non Patent Literature 3: J. J. Wen and M. A. Breazeale, "A diffraction beam field expressed as the superposition of Gaussian beams," The Journal of Acoustical Society of America, Vol. 83, Issue 5, pp. 1752-1756, 1988)

By line-integrating Expression (2) along the optical path L, the complex amplitude d of the optical phase at a frequency $f_d$ is obtained according to the following expression.

[Math. 11]

$$d = -C_{ao} p_0^{(1)} p_0^{(2)} \frac{\beta (k_d a)^2}{\rho c^2} e^{ik_d z} \int_L q_{diff} d\xi \tag{4}$$

Where $C_{ao} = k_1(n_0 - 1)/\gamma P_0$ is satisfied.

The complex amplitude d in Expression (4) is a frequency spectrum of the amount of change $\varphi_s$ of the optical phase, and corresponds to a value obtained by performing a Fourier transform on the amount of change $\varphi_s$ of the optical phase in a certain time slot to extract the component of a predetermined frequency $f_d$ therefrom.

Based on Expressions (2) and (4), the complex amplitude p of the demodulated sound having the frequency $f_d$ can be calculated by using the following expression.

[Math. 12]

$$p(\xi, \eta) = \frac{1}{C_{ao}} \frac{q_{diff}}{\int_L q_{diff}(\xi', \eta) d\xi'} d \tag{5}$$

The complex amplitude d in Expression (5) is a value obtained from the amount of change $\varphi_s$ of the optical phase obtained as a measurement result, and $C_{ao}$ is a value determined under physical conditions at the time of measurement. In addition, the value of the function $q_{diff}$ and its integral value can be calculated by determining the number of Gaussian beams used to approximate each of the carrier wave and the sideband wave and setting the radius a and the curvature radius δ of the sound source.

As can be seen from the above, by assuming that the carrier wave and the sideband wave can be represented by the sum of the Gaussian beams, the complex amplitude p of the demodulated sound can be defined by a function of the position and the wave number (see Expression (2)), and the complex amplitude p of the demodulated sound at one point in the space can be approximately obtained from the amount of change $\varphi_s$ of the optical phase obtained as a measurement result.

The acoustic characteristics of the parametric array can be accurately measured by implementing measurement without presence of spurious sound in principle in the sound measurement technique using light. Since the influence of the spurious sound is particularly remarkable in the vicinity of a transducer, it has been difficult to measure the acoustic characteristics of the parametric array in the vicinity of the transducer. Since the sound source radiation characteristics can be measured in detail by measuring the sound field using the above method, the above method is useful for inspection of the transducer and improvement to higher performance. Furthermore, the above method enables realization of a method for accurately measuring the sound pressure level and the quality of reproduced sound in a situation in which sound is heard in the vicinity of a parametric speaker due to restrictions on the installation location.

First Embodiment

An acoustic characteristics calculation device 100 receives, as input, an amount of change of an optical phase caused by sound, which is the output of a sound field measurement device 800 that measures a sound field using light, and outputs the complex amplitude of demodulated sound at one point in the space. Thus, first, the sound field measurement device 800 will be described with reference to FIG. 1.

FIG. 1 is a diagram illustrating an example of a configuration of the sound field measurement device 800. The sound field measurement device 800 illustrated in FIG. 1 includes a transducer 810, a light source 820, and a phase change measuring instrument 830. Here, the transducer 810 is a substantially circular sound source that generates demodulated sound by generating a parametric array, and can be configured as, for example, a parametric array speaker configured by arranging a plurality of microphones in a circle. Furthermore, a constituent unit including the light source 820 and the phase change measuring instrument 830 is referred to as an optical measuring device. The optical measuring device measures an amount of change of the optical phase caused by demodulated sound used to obtain acoustic characteristics of the parametric array. As the optical measuring device, any device can be used as long as the device can measure an amount of change of the optical phase, and for example, devices described in Reference Non Patent Literature 1 and Reference Non Patent Literature 4 can be used. Further, as illustrated in FIG. 1, the optical path L is set to be orthogonal to the propagation direction of ultrasonic waves (radiation sound) radiated from the transducer 810.

(Reference Non Patent Literature 4: A. Torras-Rosell, S. Barrera-Figueroa, and F. Jacobsen, "Sound field reconstruction using acousto optic tomography," The Journal of Acoustical Society of America, Vol. 131, Issue 5, pp. 3786-3793, 2012)

Hereinafter, an operation of the sound field measurement device 800 will be described. First, the transducer 810 causes demodulated sound to be generated to generate a sound field. Next, the light source 820 emits light. The light emitted from the light source 820 is subjected to phase modulation by the sound as the light passes through the sound field. The light subjected to the phase modulation by the sound is input to the phase change measuring instrument 830, a change occurs in the amount of the light depending on the amount of the phase modulation by the phase change measuring instrument 830, and the phase change measuring instrument 830 outputs the distribution of the changed light amount, that is, the amount of change of the optical phase caused by the demodulated sound.

Figure 2:
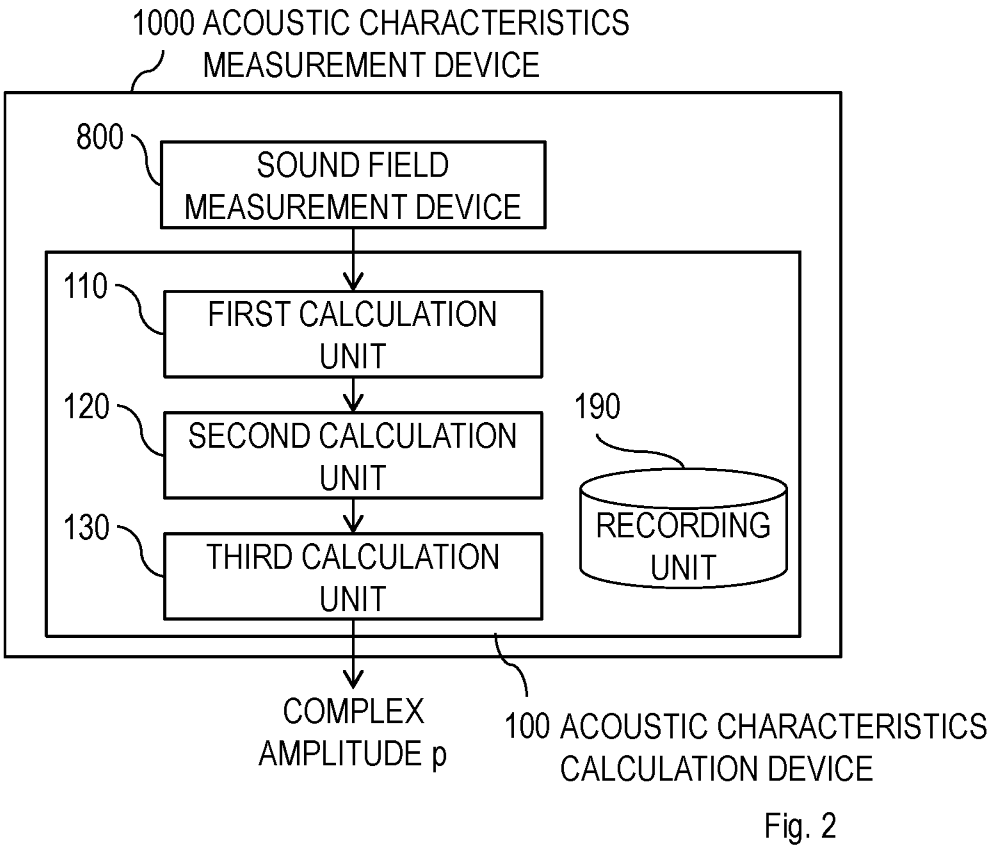
FIG. 2 is a block diagram illustrating a configuration of an acoustic characteristics calculation device 100.
Figure 3:
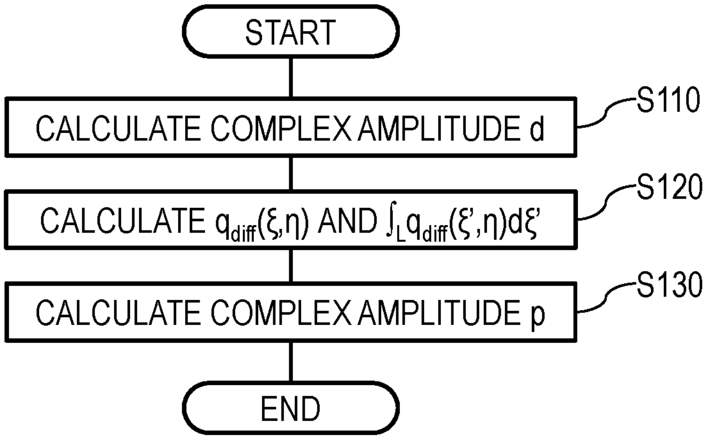
FIG. 3 is a flowchart illustrating an operation of the acoustic characteristics calculation device 100.

Hereinafter, the acoustic characteristics calculation device 100 will be described with reference to FIGS. 2 and 3. FIG. 2 is a block diagram illustrating a configuration of the acoustic characteristics calculation device 100. FIG. 3 is a flowchart showing an operation of the acoustic characteristics calculation device 100. As illustrated in FIG. 2, the acoustic characteristics calculation device 100 includes a first calculation unit 110, a second calculation unit 120, a third calculation unit 130, and a recording unit 190. The recording unit 190 is a constituent unit that appropriately records information necessary for processing of the acoustic characteristics calculation device 100. Further, the device including the sound field measurement device 800 and the acoustic characteristics calculation device 100 is referred to as an acoustic characteristic measurement device 1000.

Figure 4:
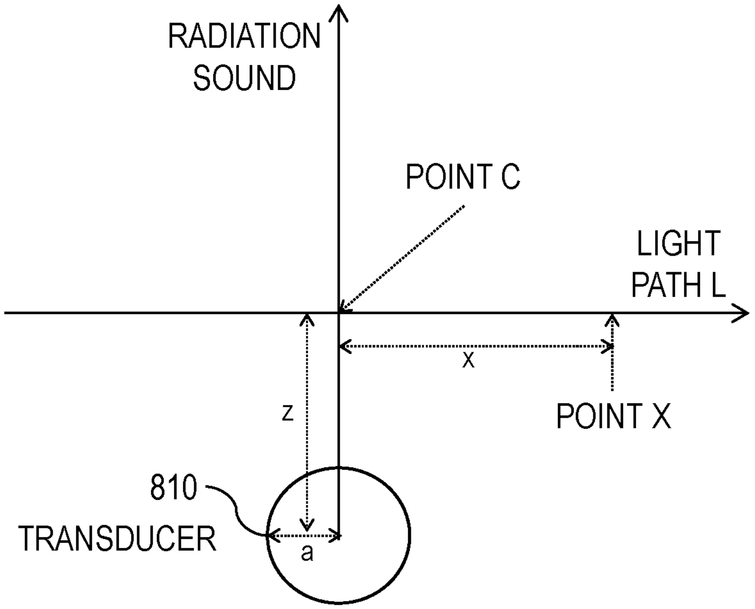
FIG. 4 is a diagram illustrating a position of a point X.

Hereinafter, L represents an optical path for the sound field measurement device 800 that measures a phase change of light due to demodulated sound S generated by the parametric array created using the transducer 810 that is a substantially circular sound source, C represents a point at which the optical path L intersects a straight line passing through the transducer 810 and parallel to the propagation direction of the demodulated sound S, X represents a point on the optical path L at which a distance from the point C is x, z represents a distance from the transducer 810 to the optical path L, a represents a radius of the transducer 810, $f_d=|f_1-f_2|$ (where $f_1$ is the frequency of a carrier wave and $f_2$ is the frequency of a sideband wave) represents a frequency of the demodulated sound S, and c represents the speed of sound. FIG. 4 is a diagram illustrating a position of a point X.

Referring now to FIG. 3, an operation of the acoustic characteristics calculation device 100 will be described.

In S110, the first calculation unit 110 receives, as input, the amount of change $\varphi_s$ of the optical phase caused by the demodulated sound S that is the output of the sound field measurement device 800, and calculates the complex amplitude d of the optical phase at the frequency $f_d$ from the amount of change $\varphi_s$ of the optical phase. Specifically, the first calculation unit 110 obtains the complex amplitude d by Fourier transforming the amount of change $\varphi_s$ in a certain time slot to extract a component of the frequency $f_d$ therefrom.

In S120, the second calculation unit 120 uses a function $q_{diff}(\xi', \eta')$ defined by the following expression to calculate a function value $q_{diff}(\xi, \eta)$ at the point X (where $\xi=x/a$, $\eta=2z/ka^2$, $k_1=f_1/c$, $k_2=f_2/c$, and $k=(k_1+k_2)/2$ are satisfied) and a line integral value $\int_L q_{diff}(\xi',\eta)d\xi'$ of the function $q_{diff}(\xi', \eta)$ along the optical path L.

[Math. 13]

$$q_{diff}(\xi', \eta') = \sum_{m=1}^{10} \sum_{m'=1}^{10} A_m A_{m'} q_{diff}^{(mm')}(\xi', \eta')$$

[Math. 14]

$$q_{diff}^{(mm')}(\xi', \eta') = \frac{1}{4r_1^{(mm')}} \exp\left(-\frac{s_1^{(mm')}}{r_1^{(mm')}}\xi'^2\right) \times \left[E_1\left(\frac{s_2^{(mm')}}{r_1^{(mm')}\left(r_1^{(mm')}\eta' + r_2^{(mm')}\right)}\xi'^2\right) - E_1\left(\frac{s_2^{(mm')}}{r_1^{(mm')} r_2^{(mm')}}\xi'^2\right)\right]$$

(Where $r_1^{(mm')}=(k_a B_{k\_bm'}+k_b B_{k\_am})+i(k_a+k_b)\eta' B_{k\_am} B_{k\_bm'}$, $r_2^{(mm')}=(k_a B_{k\_am}+k_b B_{k\_bm'})\eta'-i(k_a+k_b)$, $s_1^{(mm')}=(k_a+k_b)^2 B_{k\_am} B_{k\_bm'}$, $s_2^{(mm')}=-i(k_a+k_b)k_a k_b(B_{k\_am}-B_{k\_bm'})^2$, $B_{k\_am}=B_m^{(1)}/k_a+i/\delta$, $B_{k\_bm'}=B_{m'}^{(2)}/k_b+i/\delta$, $k_a=k_1/k$, and $k_b=-k_2/k$ are satisfied, and $A_m$, $A_{m'}$, $B_m^{(1)}$, $B_{m'}^{(2)}$, and $\delta$ are predetermined constants)

That is, the function $q_{diff}(\xi', \eta')$ is a function defined using the Gaussian beam expansion method.

Note that $A_m$, $A_{m'}$, $B_m^{(1)}$, $B_{m'}^{(2)}$ (m=1, . . . , 10, and m'=1, . . . , 10), and $\delta$ may be recorded in the recording unit 190 in advance.

In S130, the third calculation unit 130 calculates the complex amplitude p of the demodulated sound with the frequency $f_d$ at the point X with the following expression using, as input, the complex amplitude d of the optical phase at the frequency $f_d$ calculated in S110, and the function value $q_{diff}(\xi, \eta)$ at the point X and the line integral value $\int_L q_{diff}(\xi', \eta)d\xi'$ of the function $q_{diff}(\xi', \eta)$ along the optical path L calculated in S120.

[Math. 15]

$$p(\xi, \eta) = \frac{1}{C_{ao}} \frac{q_{diff}(\xi, \eta)}{\int_L q_{diff}(\xi', \eta)d\xi'} d$$

(Where $C_{ao}$ is a value determined under physical conditions at the time of measuring the sound field)

Further, $C_{ao}=k_1(n_0-1)/\gamma P_0$ is satisfied, and the wave number $k_1$ of light, the air refractive index $n_0$ in a steady state, the atmospheric pressure $P_0$ in a steady state, and the specific heat ratio $\gamma$ of air, which are used for calculation of the constant $C_{ao}$, may be recorded in the recording unit 190 in advance.

According to the embodiment of the present invention, the complex amplitude of the demodulated sound, which is an acoustic characteristic of the parametric array, can be accurately obtained by using the amount of change of the optical phase caused by the demodulated sound obtained using the sound measurement technique using light.

Hereinafter, examples to which the present embodiment is applied will be described.

Application Example 1

Frequency characteristics of a parametric speaker are measured using the present embodiment. The parametric speaker on which measurement is to be performed is installed at a desired position. One frequency is extracted from a vector having the frequency of demodulated sound as an element (hereinafter, referred to as a demodulated sound frequency vector), and the complex amplitude at the frequency at a certain point is calculated according to the present embodiment. By repeating the calculation for all the elements of the demodulated sound frequency vector, a vector having the complex amplitude of the demodulated sound of each frequency at a certain point as an element (hereinafter, referred to as a demodulated sound complex amplitude vector) is generated. As a result, a set of the demodulated sound frequency vector and the demodulated sound complex amplitude vector representing the frequency characteristics of the parametric speaker is obtained.

Application Example 2

A sound pressure of a time signal of a parametric array is measured using the present embodiment. A discrete Fourier transform is performed on the amount of change $\varphi_s$ of the optical phase, which is the discrete time signal measured by the sound field measurement device 800 to obtain a discrete frequency spectrum. With respect to the complex amplitudes at all frequencies of the discrete frequency spectrum, the complex amplitude of the demodulated sound of the frequency at a certain point is calculated according to the present embodiment, and the discrete frequency spectrum at the certain point is generated. An inverse Fourier transform is performed on the generated discrete frequency spectrum at a certain point to obtain the time waveform of the sound pressure at the point, that is, the sound pressure of the time signal of the parametric array.

Further, a discrete Fourier transform may be performed on the discrete time signal $\varphi_s$ as soon as a preset number of samples is obtained. By executing the above processing on the discrete time signal of the number of samples, the time waveform of the sound pressure at the certain point is obtained. At this time, the time waveform of the sound pressure at the certain point can be obtained in real time by the second calculation unit 120 executing the calculation in advance, which requires time to be performed. By repeating the processing for each of the predetermined number of samples until the measurement is completed, the sound pressure of the time signal of the parametric array can be measured in real time. The time waveform of the sound pressure of the demodulated sound obtained in real time can be used, for example, as input to an active sound field control device, an online diagnosis device, and an optimization device for an installation condition and a drive signal.

Supplementary Note

Figure 5:
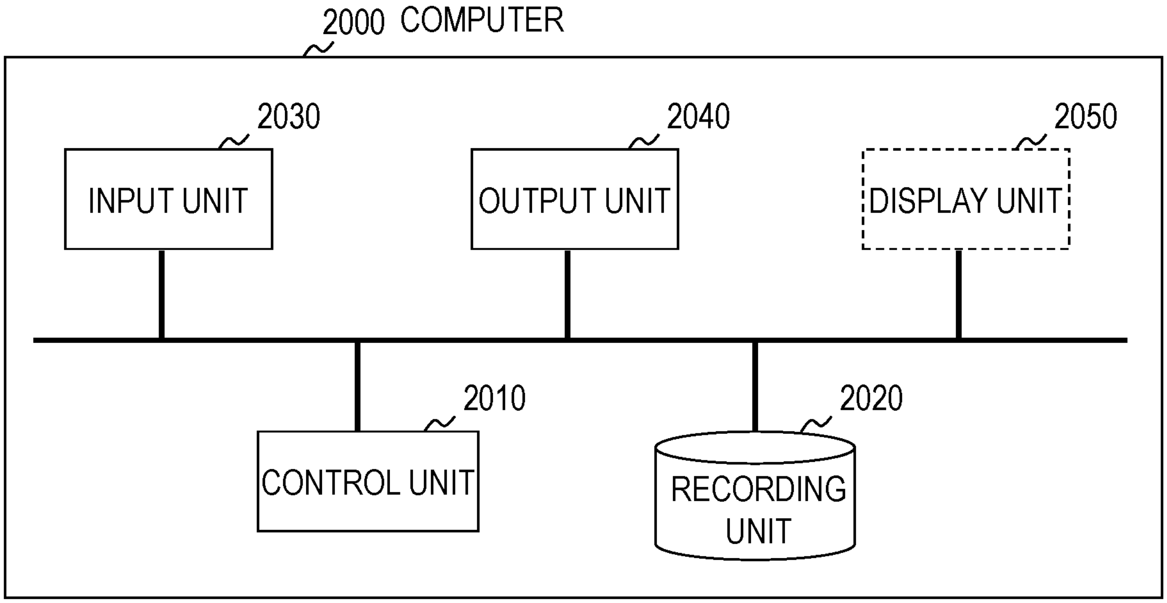
FIG. 5 is a diagram illustrating an example of a functional configuration of a computer that implements respective devices in an embodiment of the present invention.

FIG. 5 is a diagram illustrating an example of a functional configuration of a computer 2000 that implements each device described above. Processing by each device described above can be performed by a recording unit 2020 reading a program for causing the computer 2000 to function as each device described above and operate as a control unit 2010, an input unit 2030, an output unit 2040, and the like.

A device according to the present invention includes, as a single hardware entity, for example, an input unit to which a keyboard, or the like, can be connected, an output unit to which a liquid crystal display, or the like, can be connected, a communication unit to which a communication device (e.g., a communication cable) capable of communicating with the outside of a hardware entity can be connected, a CPU (Central Processing Unit, in which a cache memory, a register, or the like may be included), a RAM or a ROM as a memory, an external storage device as a hard disk, and a bus that connects the input unit, the output unit, the communication unit, the CPU, the RAM, the ROM, and the external storage device so that data can be exchanged therebetween. Moreover, a device (drive) or the like that can read and write data from and to a recording medium such as a CD-ROM may be provided in the hardware entity as necessary. Examples of a physical entity including such hardware resources include a general-purpose computer.

The external storage device of the hardware entity stores a program that is required for implementing the above-described functions, data that is required for processing of the program, and the like (the program may be stored, for example, in a ROM as a read-only storage device instead of the external storage device). Moreover, data, or the like, obtained by processing of the program is appropriately stored in a RAM, an external storage device, or the like.

In the hardware entity, each program stored in the external storage device (or ROM etc.) and data required for processing of each program are read into a memory as necessary and are appropriately interpreted, executed, and processed by the CPU. As a result, the CPU implements predetermined functions (each of the constituent units represented as . . . unit, . . . means, etc.).

The present invention is not limited to the above-described embodiments and can be appropriately modified in a range without departing from the gist of the present invention. Moreover, the processing described in the above embodiments may be executed not only in a time-series manner according to the described order, but also in parallel or individually according to the processing capability of the device that executes the processing or as necessary.

As described above, in a case where the processing function of the hardware entity (the device according to the present invention) described in the above embodiment is implemented by a computer, the processing content of the function of the hardware entity is described by a program. In addition, as the computer executes the program, the processing function of the hardware entity is implemented on the computer.

The program describing the processing content may be recorded on a computer-readable recording medium. The computer-readable recording medium may be, for example, any recording medium such as a magnetic recording device, an optical disc, a magneto-optical recording medium, or a semiconductor memory. Specifically, for example, a hard disk device, a flexible disk, a magnetic tape, or the like, can be used as a magnetic recording device, a DVD (Digital Versatile Disc), a DVD-RAM (Random Access Memory), a CD-ROM (Compact Disc Read Only Memory), a CD-R/RW (Recordable/ReWritable), or the like, can be used as an optical disk, an MO (Magneto-Optical Disc), or the like, can be used as a magneto-optical recording medium, an EEPROM (Electronically Erasable and Programmable-Read Only Memory), or the like, can be used as a semiconductor memory.

Distribution of the program is performed by, for example, selling, transferring, or renting a portable recording medium such as a DVD or a CD-ROM on which the program is recorded. Furthermore, a configuration in which the program is distributed by storing the program in a storage device of a server computer and transferring the program from the server computer to other computers via a network may also be employed.

For example, the computer that executes such a program first temporarily stores the program recorded in a portable recording medium or temporarily stores the program transferred from the server computer in the storage device of the own computer. In addition, to perform the processing, the computer reads the program stored in the storage device of the computer, and executes the processing in accordance with the read program. In addition, as another performance mode of the program, the computer may read the program directly from the portable recording medium and perform processing in accordance with the program, or alternatively, the computer may sequentially perform processing in accordance with the received program every time the program is transferred from the server computer to the computer. In addition, the above-described processing may be executed in a so-called ASP (Application Service Provider) type service that implements a processing function only by an execution instruction and a result acquisition, without transferring the program from the server computer to the computer. Further, the program according to the present embodiment is assumed to include information used for processing by an electronic computer and an equivalent to the program (data or the like that is not a direct command to the computer but has a feature that defines processing of the computer).

Moreover, although the hardware entity is configured by executing a predetermined program on a computer in the embodiment, at least some of the processing content may be implemented by hardware.

The above description of the embodiments of the present invention has been presented for purposes of illustration and description. There is no intention to be comprehensive or to limit the invention to the disclosed precise form. Modifications and variations can be made according to the foregoing instructions. The embodiments have been selected and represented in order to provide the best illustration of the principles of the present invention and to enable those skilled in the art to utilize the present invention in various embodiments with various modifications added such that the present invention is appropriate for considered practical use. All such modifications and variations are within the scope of the present invention as defined by the appended claims interpreted in accordance with a fairly and legally equitable breadth.

The invention claimed is:

1. An acoustic characteristics measurement device comprising a transducer configured to generate a parametric array to generate demodulated sound S as audible sound in a sound field, the transducer being a substantially circular sound source;

a phase change measurement device configured to measure a phase change of light due to the demodulated sound S;

a light source device configured to emit the light along an optical path toward the phase change measurement device through the sound field; and a processor configured to execute operations comprising:

where L represents the optical path for the phase change measurement device,

C represents a point at which the optical path L intersects a straight line passing through the transducer and parallel to a propagation direction of the demodulated sound S, X represents a point on the optical path L at which a distance from the point C is x, z represents a distance from the transducer to the optical path L, a represents a radius of the transducer, $f_d=|f_1-f_2|$ (where $f_1$ is a frequency of a carrier wave and $f_2$ is a frequency of a sideband wave) represents a frequency of the demodulated sound S, and c represents a speed of sound, calculating a complex amplitude d of an optical phase at the frequency $f_d$ from an amount of change $\varphi_s$ of the optical phase caused by the demodulated sound S;

where a function $q_{diff}(\xi', \eta')$ represents a predetermined function using a Gaussian beam expansion method, calculating a function value of the function $q_{diff}(\xi, \eta)$ at the point X (where $\xi=x/a$, $\eta=2z/ka^2$, $k_1=f_1/c$, $k_2=f_2/c$, and $k=(k_1+k_2)/2$ are satisfied) and a line integral value $\int_L q_{diff}(\xi', \eta)d\xi'$ of the function $q_{diff}(\xi', \eta)$ along the optical path L; and calculating a complex amplitude p of the demodulated sound with the frequency $f_d$ at the point X using the complex amplitude d of the optical phase at the frequency $f_d$, the function value $q_{diff}(\xi, \eta)$ at the point X, and the line integral value $\int_L q_{diff}(\xi', \eta)d\xi'$ of the function $q_{diff}(\xi', \eta)$ along the optical path L, and the complex amplitude p of the demodulated sound represents an acoustic characteristic of the parametric array with accuracy.

2. The acoustic characteristics calculation device according to claim 1, wherein the function $q_{diff}(\xi', \eta')$ is a function defined by the following expressions:

$$q_{diff}(\xi', \eta') = \sum_{m=1}^{10} \sum_{m'=1}^{10} A_m A_{m'} q_{diff}^{(mm')}(\xi', \eta')$$

$$q_{diff}^{(mm')}(\xi', \eta') = \frac{1}{4r_1^{(mm')}} \exp\left(-\frac{s_1^{(mm')}}{r_1^{(mm')}}\xi'^2\right) \times \left[E_1\left(\frac{s_2^{(mm')}}{r_1^{(mm')}\left(r_1^{(mm')}\eta' + r_2^{(mm')}\right)}\xi'^2\right) - E_1\left(\frac{s_2^{(mm')}}{r_1^{(mm')} r_2^{(mm')}}\xi'^2\right)\right]$$

(where $r_1^{(mm')}=(k_a B_{k\_bm'}+k_b B_{k\_am})+i(k_a+k_b)\eta' B_{k\_am} B_{k\_bm'}$, $r_2^{(mm')}=(k_a B_{k\_am}+k_b B_{k\_bm'})\eta'-i(k_a+k_b)$, $s_1^{(mm')}=(k_a+k_b)^2 B_{k\_am} B_{k\_bm'}$, $s_2^{(mm')}=-i(k_a+k_b)k_a k_b (B_{k\_am}-B_{k\_bm'})^2$, $B_{k\_am}=B_m^{(1)}/k_a+i/\delta$, $B_{k\_bm}=B_{m'}^{(2)}/k_b+i/\delta$, $k_a=k_1/k$, and $k_b=-k_2/k$ are satisfied, and $A_m$, $A_{m'}$, $B_m^{(1)}$, $B_{m'}^{(2)}$, and $\delta$ predetermined constants), and the calculating the complex amplitude p further comprises generating the complex amplitude p using the following expression:

$$p(\xi, \eta) = \frac{1}{C_{ao}} \frac{q_{diff}(\xi, \eta)}{\int_L q_{diff}(\xi', \eta) d\xi'} d$$

(where $C_{ao}$ is a value determined under a physical condition at a time of measuring a sound field).

3. A non-transitory recording medium recording a computer-executable program instructions that when executed causes a computer to function as the acoustic characteristics measurement device according to claim 1.

4. An acoustic characteristics measurement method comprising:

generating a parametric array, by a transducer, to generate demodulated sound S as audible sound in a sound field, the transducer being a substantially circular sound source;

measuring, by a phase change measurement device, a phase change of light due to the demodulated sound S;

emitting, by a light source device, the light along an optical path toward the phase change measurement device through the sound field;

where L represents the optical path for the phase change measurement device,

C represents a point at which the optical path L intersects a straight line passing through the transducer and parallel to a propagation direction of the demodulated sound S, X represents a point on the optical path L at which a distance from the point C is x, z represents a distance from the transducer to the optical path L, a represents a radius of the transducer, $f_d=|f_1-f_2|$ (where $f_1$ is a frequency of a carrier wave and $f_2$ is a frequency of a sideband wave) represents a frequency of the demodulated sound S, and c represents the speed of sound, calculating a complex amplitude d of an optical phase at the frequency $f_d$ from an amount of change $\varphi_s$ of the optical phase caused by the demodulated sound S;

where a function $q_{diff}(\xi', \eta')$ represents a predetermined function using a Gaussian beam expansion method, calculating a function value of the function $q_{diff}(\xi, \eta)$ at the point X (where $\xi=x/a$, $\eta=2z/ka^2$, $k_1=f/c$, $k_2=f_2/c$, and $k=(k_1+k_2)/2$ are satisfied) and a line integral value $\int_L q_{diff}(\xi', \eta)d\xi'$ of the function $q_{diff}(\xi', \eta)$ along the optical path L; and calculating a complex amplitude p of the demodulated sound with the frequency $f_d$ at the point X using the complex amplitude d of the optical phase at the frequency $f_d$, the function value $q_{diff}(\xi, \eta)$ at the point X, and the line integral value $\int_L q_{diff}(\xi', \eta)d\xi'$ of the function $q_{diff}(\xi', \eta)$ along the optical path L, and the complex amplitude p of the demodulated sound represents an acoustic characteristic of the parametric array with accuracy.

* * * * *